(12) United States Patent
Bacher et al.

(10) Patent No.: US 6,378,705 B1
(45) Date of Patent: *Apr. 30, 2002

(54) APPARATUS FOR FILTERING PLASTICIZED THERMOPLASTICS

(76) Inventors: Helmut Bacher, Bruck/Hausleiten 17; Helmuth Schulz, Badstrasse 20, both of St. Florian A-4490; Georg Wendelin, Waldbothenweg 84, A-4033 Linz, all of (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,301
(22) PCT Filed: Dec. 2, 1996
(86) PCT No.: PCT/AT96/00240
  § 371 Date: Jul. 22, 1998
  § 102(e) Date: Jul. 22, 1998
(87) PCT Pub. No.: WO97/26973
  PCT Pub. Date: Jul. 31, 1997

(30) Foreign Application Priority Data
  Jan. 22, 1996 (AT) ................................. 102/96

(51) Int. Cl.$^7$ ................................. B01D 33/46
(52) U.S. Cl. ................... 210/397; 210/402; 495/197
(58) Field of Search ................................. 210/396, 397, 210/784, 433.1, 402, 350, 407, 408, 413, 359; 425/197, 199

(56) References Cited

U.S. PATENT DOCUMENTS

| 4,003,837 A | * | 1/1977 | Osborne |
| 4,150,932 A | * | 4/1979 | Moghe |
| 4,529,520 A | * | 7/1985 | Lampenius |
| 5,062,952 A | * | 11/1991 | Neuman |
| 5,147,543 A | * | 9/1992 | Frejborg |
| 5,510,030 A | * | 4/1996 | Bacher et al. |
| 5,643,450 A | * | 7/1997 | Bacher et al. |

FOREIGN PATENT DOCUMENTS

| DE | 31 22 131 A | 12/1982 |
| WO | WO 93 15819 A | 8/1993 |
| WO | WO 94 17981 A | 8/1994 |

* cited by examiner

Primary Examiner—Ana Fortuna
Assistant Examiner—Richard W. Ward
(74) Attorney, Agent, or Firm—Salter & Michaelson (57) ABSTRACT

An apparatus for filtering plasticized thermoplastic synthetic plastic material is provided. The apparatus provides increased transport of thickened material toward the discharge channel. The apparatus includes at least one filter element having an inflow side that is brushed over by scrapers to guide waste residues along the surface of the filter element to the discharge channel. A non-perforated zone facing the scrapers includes grooves. The non-perforated zone is also brushed over by the scrapers.

26 Claims, 4 Drawing Sheets

APPARATUS FOR FILTERING PLASTICIZED THERMOPLASTICS

BACKGROUND AND SUMMARY OF THE INVENTION

The invention refers to an apparatus for filtering plasticized thermoplastic synthetic plastic material, comprising a housing with at least one inflow channel for the material to be filtered, which channel leads this material to the inflow side of at least one filter element, whereby the filter element has fine filtering holes for the filtrate and from the outflow side of the filter element to at least one outflow channel for the filtrate leads out of the housing, and whereby at the inflow side of the filter element scrapers moved relative to the filter element are disposed their scraping edges brushing over the filter element; push the waste residues across the surface of the filter element to at least one discharge channel, and whereby, in the direction in which the waste residues are being carried off, there is a non-perforated zone adjoining the zone of the filter element with filtering holes, which non-perforated zone is also brushed over by the scrapers.

The invention also refers to a filter element for an apparatus of this kind.

An apparatus of this kind is known (WO 93/15819). There, the non-perforated zone adjoining the hollow cylindrical perforated filter area is executed as a solid cylinder to increase the resistance to torsional strain of the filter element rotating around its longitudinal axis.

The object of the invention is to improve an apparatus for filtering plasticized thermoplastics synthetic plastic masses of the aforementioned kind by further increasing its service life and filtering efficiency. The invention solves this task by having grooves present in the surface of the non-perforated zone of the filter element facing the scrapers, which grooves are placed in a direction which intersects the direction of the scraping edges scraping over these grooves such that the thickened material on the non-perforated zone is transported to an even greater extent toward the discharge channel.

The invention is based on the following findings: in most of the currently known filter apparatuses, the scrapers glide over the perforated area of the filter, pushing the impurities separated out from the melt being filtered in front of them and toward the discharge channel. This residual material thickens increasingly as it moves toward the discharge channel and the usually solid impurities have an abrasive effect on the filter area. For this reason, there is extreme wear in the filter element in the discharge channel area which leads to the removal of the material of the filter element so that the filter element in this area is ultimately unable to withstand the pressures being exerted against it anymore and breaks. The danger of this happening increases with the pressure exerted by the synthetic plastic material fed in to be filtered, which pressure can reach 300 bar and more in modern filter devices. The wear of the filter element is increased even more by the holes in the filter area acting more or less as abutments for the residue material being transported by the scrapers, because granular constituents in the residue material fit positively into these holes and enter them.

Moreover, investigations have also shown that the concentration of solid constituents in the material the scrapers push along in front of them is extremely high right in front of the scrapers, i.e. this material is thickened to a high degree. However, immediately behind the scrapers, a clean zone emerges into which zone the pressurized material being filtered flows. When such still substantially unfiltered constituents of the melt enter the area of the discharge channel, relatively pure material is drawn off there. The material conveyed off in the discharge channel, usually by means of a discharge screw, is therefore highly non-homogeneous in its composition, because there is a constant changeup between portions coming from the areas behind the scrapers with portions coming from in front of it. Those portions from in front of the scrapers usually contain highly thickened material with a relatively high proportion of impurities whereas those from behind the scrapers are relatively high in plastics and the share of impurities is quite low.

By means of the measure taken in accordance with the invention, the scrapers now do not scrape across an area of the filter element perforated throughout but rather the non-perforated zone, with its grooves, adjoining the discharge channel create what are more or less abutments for the circulating solid material so that this material is transported to a greater extent toward the waste discharge channel. As to say, the grooves, in effect, promote conveyance. Thereby in an advantageous manner the effect is achieved that the impurities collect in the area adjoining the waste discharge channel, pushing away the plastics material, that is the useful constituents of the melt, so that the useful constituents once again arrive in the perforated area of the filter and are filtered through the holes there. As a result, the material found in the discharge channel becomes more homogenous than that in the known design initially described—and also relative to other common types of filters whose filter surface is brushed over by scrapers—and, surprisingly, less plastic that is lost, reaches the discharge channel, than was expected. One would expect, namely, that the non-perforated zone would result in a worse filtration of the material, however, in reality just the contrary is the case.

Moreover, the grinding effect becomes less on the impurity constituents of the thickened mass transported by the scrapers in comparison to a perforated zone of the filter since the grooves in the design in accordance with the invention have a less anchoring effect on the solid constituents of the residual material than the holes do.

The invention is applicable both to filter elements which are longitudinally symmetrical, that is more or less hollow cylinders or filter elements shaped like the envelopes of a cone, e.g. such as those in accordance with the aforementioned WO 93/15819, as well as, to particular advantage, to disk-shaped filter elements, particularly those shaped as circular disks, in which the discharge channel for the contaminants is positioned centrally. The reason for this latter feature is that the thickening of the residual material becomes especially great there. In any case, the filter element can be impinged either from within or from without by the material being filtered, i.e. the material can flow through the filter element either from in to out or from out to in.

The invention is likewise non dependent on whether it is the filter element which is moved (as with the aforementioned WO) or the scrapers or both elements.

In accordance with a preferred embodiment of the invention, the non-perforated zone of the filter element has a greater wall thickness than the perforated zone. The advantage of this approach is that the grooves in the non-perforated zone can be deep enough to be able to fulfill their desired conveyance function to a great extent. In a hollow cylindrical filter element, as the document mentioned initially indicates, the non-perforated zone does not by any means have to be solidly executed, in fact, it can be in the shape of a hollow cylinder, just as the perforated filter zone is. The hollow space created thereby not only reduces the weight and the material required, it can also be used to accomodate other parts of the apparatus.

The ratio of the length of the non-perforated zone, as measured in the direction in which the residues are removed, to that of the perforated zone measured in the same direction is advisably from 0.5:1 to 1:1, this ratio will depend on the prevailing circumstances and the type of synthetic plastic material usually being processed.

In accordance with a preferred embodiment of the invention, the axes of the holes in the perforated zone are inclined in the direction of the removal of the residues, preferably at an angle of 60 to 80° to the surface of the filter element. When the filter element is disk-shaped, it is advisable within the scope of the invention to have the plastics material be fed in from the edge, whereby the discharge channel is arranged in the center of the filter element and a screw is positioned in the discharge channel to transport the residues. In a disk-shaped filter element of this kind, it is also favorable within the scope of the invention to have the axes of the filtering holes in the perforated zone be inclined relative to the radial direction of the filter element, preferably at an angle of 30 to 90°. In such a case, the axes of the filtering holes are thus inclined both in relation to the radial direction of the filter element and to the plane of the filter element However, in no instance may the holes be inclined opposite the motion direction of the scraper edges, because this would cause the grains contained in the contaminant material to be pressed into the filtering holes immediately. This, on the one hand would block these filtering holes and, on the other, exert an extreme strain on the shear edges of the scrapers.

The grooves, like the scraping edges of the scrapers, need not be straight. In fact, in many cases it is favorable to have the scrapers and/or grooves run along curved lines, e.g. helix-like. In this case, it is advisable within the scope of the invention to have the grooves curved opposite to the curve of the scrapers.

Suitably, the grooves have a saw-like cross section whose steeper flank is disposed on the back side of the scrapers. Here, the grooves create a positive interlocking effect between the thickened waste residues and the scraper edges. This steeper flank forms an edge which blocks the thickened residue material, thus promoting the transport of this material in the direction towards the discharge channel.

The scrapers can be made of continuous strips. However, it is more favorable within the scope of the invention to arrange the scrapers along strip-like paths, whereby however each path is divided into spaced scraper elements, whereby the gaps between adjacent scraper elements of successive scrapers are offset in relation to each other, as seen in the direction of rotation of the scrapers or of the filter element. The advantage of subdividing the scraper strips into individual elements is that the scraper edges formed by these scraper elements are sure to engage the surface of the filter element even if the filter element bends from the high pressure exerted by the material being filtered, which pressure can reach 300 bar and more. This staggered arrangement of the scraper elements ensures that portions of the material passing through the gaps between adjacent scraper elements of a preceding scraper strip are caught by the elements of the following scraper strip. For safety's sake, adequate overlap should be provided for in each case, otherwise, ring-shaped zones of contaminants would build up which would no longer be able to be removed. It would of course be possible to divide the scraper strip into elements that gaplessly adjoin each other, however solid particles, e.g. glass shards, could then adhere to the transition point between two adjacent scraper elements, which particles would be unable to free themselves from this point while the scraper strip rotates and would merely be transported in a circle. The result would be circular pattern of wear of the filter element. However, if the individual scraper elements belonging to a given path are spaced apart from each other, the solid particles can pass through the gaps between the two scraper elements and then be caught by the following scraper element and be transported to the waste discharge channel, at the latest due to the combined effect of the latter element and the grooves in the non-perforated area of the filter element.

A very high degree of efficiency is achieved with a design in which the inflow channel is placed between two parallel disk-shaped filter elements which are brushed over by scrapers attached to a scraper carrier, preferably disk-shaped too, arranged between the filter elements and associated to both filter elements. A construction of this kind can be executed with a single discharge screw in the discharge channel, however the disadvantage of this arrangement is that the residues can flow directly to the screw from just one of the two filter disks. From the other filter disk, the residues would have to squeeze through openings in the scraper carrier which openings are separated from each other by spoke-like webs. With this, it is difficult to reroute the residues consisting mostly of solids and by such a design it is impossible to achieve high degrees of thickening. It is therefore more favorable within the scope of the invention to assign each of the two filter elements to its own screw section, whereby the two screw sections convey the material in opposite directions. In this way, the aforementioned rerouting of the residues is avoided. If a temperature control is assigned to at least one of the two screw sections, the conditions in the discharge material can be influenced by regulating the temperature of the plastics material in the area of the waste discharge screw. If one determines, for example, that the waste discharged contains 10% more plastics material on one screw side, then the temperature control can be used on this side to thicken the material being removed such that the portion of plastics material in the waste discharged on this side is reduced. In this way, the discharges on both sides can be equalized.

A further important aspect is that a provision must be made so the batches of solids transported by the scrapers to the discharge channel are reliably engaged by the screw bearingly supported in the discharge channel. The ideal situation would be if the screw flights were simply a continuation of the scraper strips. However, this is difficult to achieve in practice since provisions are usually made for a large number of scraper strips and having the same number of screw flights would mean the screw flights are very close together. This, in turn, would make it more difficult for material to be taken along by the screw. It is therefore preferable to arrange the system such that the material transported to the periphery of the screw by the scraper strips always strikes a gap between two adjacent screw flights. The number of screw flights in this case is therefore at most equal to the number of scraper strips and usually lower.

In the perforated filter area, it is advisable for the scraper elements to have a resilient support and to therefore be pressed against the filter cylinder or filter disk. This pressure can be exerted by spring members, but also, additionally or alternatively, by the pressure of the supplied material or by the difference in pressure between the inflow and outflow side of the filter. This difference in pressure can be approx. 100 bar. By contrast, in the non-perforated zone of the filter cylinder or filter disk, the scrapers can be rigid elements arranged on the scraper carrier, that is, for example, a shallow-flight screw rigidly mounted on a scraper carrier disk.

A filter element in accordance with the invention for an apparatus of the described type in accordance with the invention is based on a design in which a non-perforated zone adjoins a perforated zone. A filter element of this kind is characterized by the fact that a provision is made to have grooves made in the non-perforated zone on the inflow side of the filter element. Preferably, the wall in the non-perforated zone is thicker than the one in the perforated zone.

BRIEF DESCRIPTION OF THE DRAWINGS

In the drawing, examplative embodiments of the invention are presented schematically.

DETAILED DESCRIPTION OF THE ILLUSTRATIVE EMBODIMENTS

Figure 1:
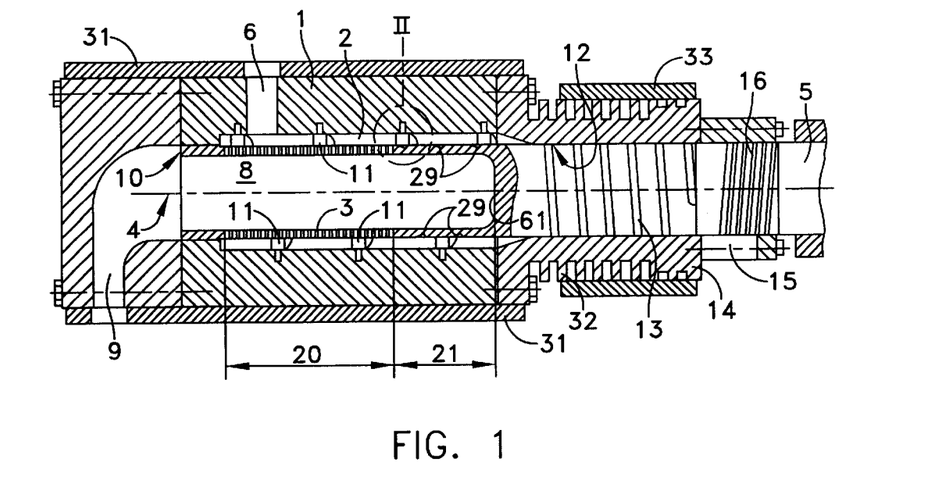
FIG. 1 shows an axial section through a first embodiment.
Figure 2:
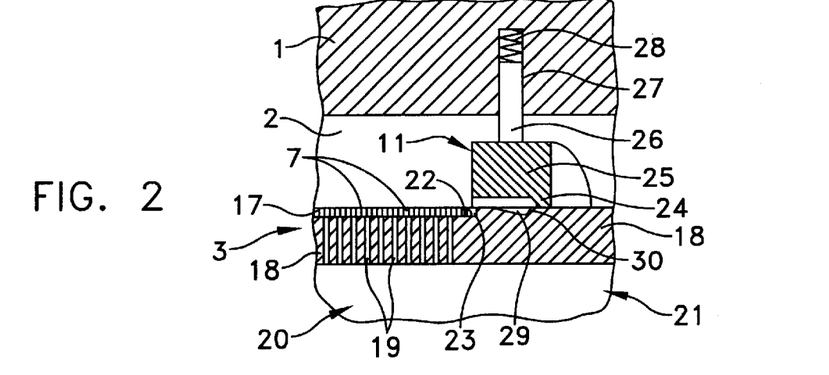
FIG. 2 shows a larger-scale section of the detail marked with ii in FIG. 1.

In the embodiment according to FIGS. 1 and 2, the apparatus has a hollow cylindrical housing 1 with walls of a thickness sufficient to withstand the high pressures exerted by the synthetic plastic material to be filtered (approx. 300 bar). In the cylindrical hollow space 2 of the housing 1, an essentially hollow cylindrical filter element 3 is bearingly supported such that it rotates around its longitudinal axis 4. It is connected for common rotation to a shaft 5 which is driven for rotation around the longitudinal axis 4 by a motor not depicted here. The plasticized thermoplastics to be filtered are supplied through at least one inflow channel 6 arranged substantially radially into the hollow space 2 to the outer side of the filter element 3. The filtrate which can pass through the fine filtering holes 7 (FIG. 2) of the filter element 3 arrives in the interior space 8 of the filter element 3 and flows from there into at least one, advisably radially oriented, outlet channel 9, which adjoins the one open front end 10 of the filter element 3 and extends laterally to the outside of the housing 1. Of course, if desired, the filtrate can also be drawn off in the direction of the longitudinal axis 4. The residues retained by the filter element 3, that is the impurities of the supplied plasticized thermoplastics, are scraped off the outer surface of the filter element 3 by scrapers 11. The scrapers 11 are arranged such that when the filter element 3 rotates around its longitudinal axis 4, the residues are conveyed toward a waste discharge channel 12 in which a screw 13 is arranged which consists of screw flights disposed on the shaft 5 and which conveys the residues in the direction of a waste discharge opening 15 leading laterally out of an extension 14 of the housing 1. The shaft 5 also has a thread 16 with a pitch opposite that of the screw 13, which thread acts as a seal.

The filter element 3 (FIG. 2) consists of a thin hollow cylinder 17, preferably of a sheet metal joined to form a hollow cylinder, in which the fine openings 7 are placed, which are preferably executed as laser-drilled bores. To withstand the pressure of the infed material to be filtered, the inner side of the hollow cylinder 17 is abutted by a hollow cylindrical supporting body 18 which has bores 19, which, suitably though not compulsory, extend radially and have diameters substantially greater than those of the fine filtering holes 7 so that several filtering holes 7 converge on one bore 19 in each case. The filtering holes 7 or the bores 19 lying behind them in the direction in which the filtrate flows constitute a perforated zone 20 (FIG. 1) of the filter element 3 which area adjoins a non-perforated zone 21 constituted by an axial extension of the filter element 3 or the supporting body 18, respectively. As FIG. 2 illustrates, the arrangement is, for design reasons, such that the non-perforated zone 21 is made up essentially entirely of the supporting body 18, which has a stop 22 in its outer periphery in which the hollow cylinder 17 is inserted and attached by means of a weld 23. Of course, the hollow cylinder 17 can also be fastened on the supporting body 18 on the other contact surfaces. In this way, the hollow cylinder 17 not only has sufficient support but also is sure to follow in rotating around the longitudinal axis 4. As FIG. 1 illustrates, the supporting body 18 can give way as a single piece to the shaft 5 and, together with a wall 61 running essentially radially, can form the closure of the interior space 8, when seen in the axial direction.

Scrapers 11 are also placed in the area of the non-perforated zone 21. For the sake of expediency, the scrapers 11 are fitted in each case with scraping edges 24 which scrape the impurities off the outer surface of filter element 3. The scrapers 11 or their scraper edges 24 are arranged along a helix of constant pitch but subdivided into individual scraper elements 25, each of which is attached resiliently in the housing 1 yet such that they cannot turn. For this purpose, each scraper element 25 carries two bolts 26 on its outer periphery extending parallel with each other and inserted into corresponding bores 27 of the housing and are there resiliently supported by springs 28. This springy support of each scraper element 25 can be augmented or replaced by the scraper element 25 being pressed against the hollow cylinder 17 by the pressure of the infed plastics material, which pressure is exerted radially from the outside on the scraper element 25. In the area of the non-perforated zone 21, a springy support of the scraper elements 25 can be eliminated altogether since the only important thing in this area is that the residue material, which is basically already in a thickened state there, is transported reliably in the direction towards the waste discharge channel 12. For this purpose, the non-perforated zone 21, or the supporting body 18 constituting it, respectively, has grooves 29 on its outer surface, the direction of which grooves intersects with the direction of the scraper edges 24 of the scraper elements 25 brushing over them, so that with the relative movement between the scraper elements 25 and the grooves 29, there is an increase in the conveyance of residues in the direction towards the waste discharge channel 12. This is achieved because the grooves 29 act as abutments for the residue material such that the effect of the inclination of the scraping edges 24 of the scraper elements 25 is intensified. The cross section of each groove 29 is somewhat like a sawtooth, whereby the steeper flank 30 faces the discharge channel 12. Just as the scraper elements 25 are arranged in helical rows, the grooves 29, too, can run helically around the periphery of the non-perforated zone 21. When seen in the circumferential direction of the supporting body 18, they can be interrupted in a way similar to the execution of the scraper elements 25.

In order to maintain the desired temperature conditions in operation of the apparatus, a heater 31 in the form of a strip heater is provided on the outside of the housing 1 and, in the area of the screw 13 at the extension 14 of the housing 1, cooling ribs 32 and a cooling device 33 are disposed.

In the embodiment shown in FIG. 1, the length of the perforated zone 20 as measured axially is about double that of the non-perforated zone 21 as measured in the same direction.

The arrangement of the non-perforated zone 21 does not increase the content of useful plastics material in the material of residues discharged through the discharge opening 15. In fact, a thickened mass collects on the non-perforated zone which mass is already essentially free of plastics constituents. The plastic constituents still remaining in this material are conveyed back into the perforated zone 20 by the pressure being exerted and are rendered useful there by the filtering holes 7. The increased abrasive effect of the thickened material in the area of the non-perforated zone 21 has no disadvantageous effect since a deformation of the grooves 29 by the effects of abrasion has no essential influence on their function and the increased radial thickness of the material of the non-perforated zone 21 (supporting body 18) prevents there a breakage due to occurrences of abrasion.

Figure 3:
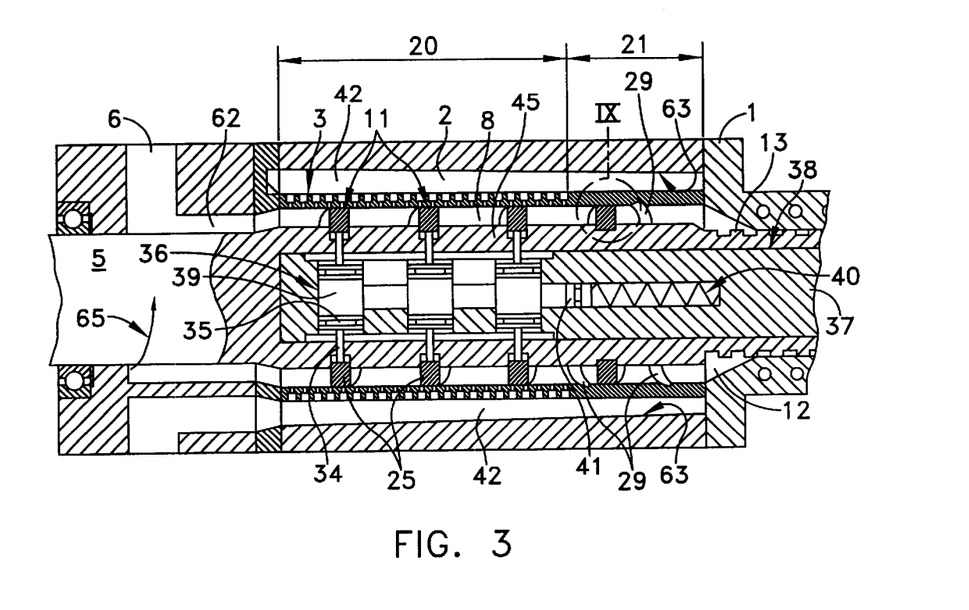
FIG. 3 is an axial section through a further embodiment.
Figures 4, 7:
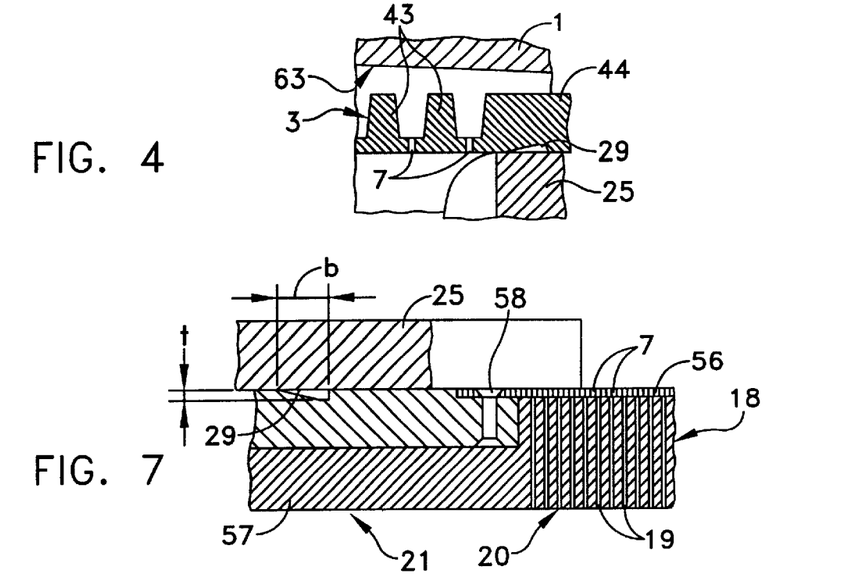
FIG. 4 shows a larger-scale section of the detail marked with IV in FIG. 3.
FIG. 7 is a larger-scale section along the line VII—VII in FIG. 6.
Figure 5:
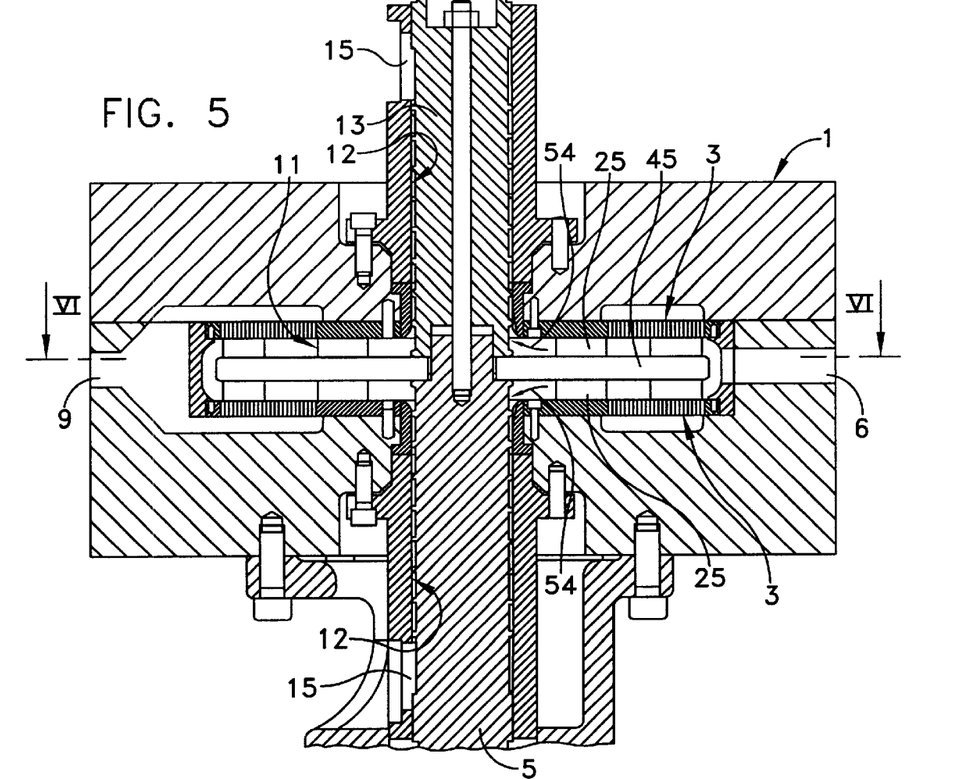
FIG. 5 is an axial section through a third embodiment.

Contrary to the embodiment in accordance with FIGS. 1 and 2, in the embodiment in accordance with FIGS. 3 and 4, the filtrate passes through the filter element 3 from the inside going out. For this purpose, the inflow channel 6 runs into the cylindrical inner space 8 of the hollow cylindrical filter element 3, suitably via an annular distribution chamber 62, in which filter element the scraper elements 25 are also arranged. In the area of the perforated zone 20 and directly next to it, these scraper elements 25 are pressed resiliently against the inner surface of the filter element 3. For this purpose, the scraper elements 25 each have radial bolts 34 on their inner side, the end of which bolts bear pistons 35, which are tightly guided in radial bores 36 of a central shaft member 37. This shaft member 37 is inserted in an axial bore 38 of the shaft 5 and positively connected thereto to rotate along with it. The pistons 35 are pressurized by a hydraulic medium located in a centrally mounted hydraulic chamber 39, whereby this pressure can be created by a spring 40 which acts on this medium via a piston 41 or by an external pressure-medium-source not illustrated.

Whereas in the embodiment in accordance with FIGS. 1 and 2 the filter element 3 is rotated and the scrapers 11 are fixed in the housing 1 to be non-rotating, the embodiment in accordance with FIGS. 3 and 4 have the opposite layout. There the scrapers 11 or the scraper elements 25 constituting them are turned by the shaft 5 and the filter element 3 is fixed into the housing 1 and does not move. The filter element 3 is surrounded by a cylindrical collecting chamber 42 for the filtrate which chamber is connected with the outflow channel 9.

From FIG. 3 it is clear that the scraper elements 25 drawn in on the right in the zone 21 are not supported resiliently, but are fixed rigidly in the shaft 5. As already mentioned, the reason for this is that in the non-perforated zone 21 a springy support of the scraper elements is no longer required for conveying away the thickened waste residues in conjunction with the grooves 29. FIG. 4 shows even more clearly the arrangement of the grooves 29 in the inner surface of the non-perforated zone 21.

Further, the embodiment in accordance with FIGS. 3 and 4 differs from that in accordance with FIGS. 1 and 2 in that the filter element 3 including the non-perforated zone 21 is executed out of a single piece. Between the individual openings 7, which, suitably are executed with cross sections which broaden as one moves outward, a provision is made for reinforcing ribs 43 which provide the necessary abutment for the filter element 3 to withstand the pressure of the infed material to be filtered. These reinforcing ribs 43 have the same thickness as the hollow cylindrical section 44 forming the non-perforated zone, the grooves 29 being placed on the inside surface of this section. Execution and cross section of the grooves and the scraper elements 25 scraping over them can be selected analogous to the embodiment in accordance with FIGS. 1 and 2, however, because the direction in which the material permeates the filter element 3 is different, the screw placed in the discharge channel 12 is positively connected to rotate with the shaft 5 acting as a rotating scraper carrier 45 and not, as in the embodiment in accordance with FIGS. 1 and 2, with the filter element 3. The direction of rotation of the shaft 5 (arrow 65) and thus the rotation of the scraper elements 25 is selected such that the impurities scraped off filter element 3 are transported as desired in the direction towards the discharge channel 12, which transport, as mentioned earlier, is favoured by the grooves 29.

The hollow space 2 need not have the same thickness everywhere, as measured radially. As FIG. 3 shows, the inner wall 63 of the housing 1 adjoining the outside of the hollow space 2 can taper slightly conically toward the waste discharge channel 12. This arrangement takes into account the fact that the volume per unit of time of the residues being removed in zone 21 is less than the volume per unit of time of material fed in for filtering via the inflow channel 6 since the filtrate has been drawn off through the openings 7 of the filter element 3.

Figure 8:
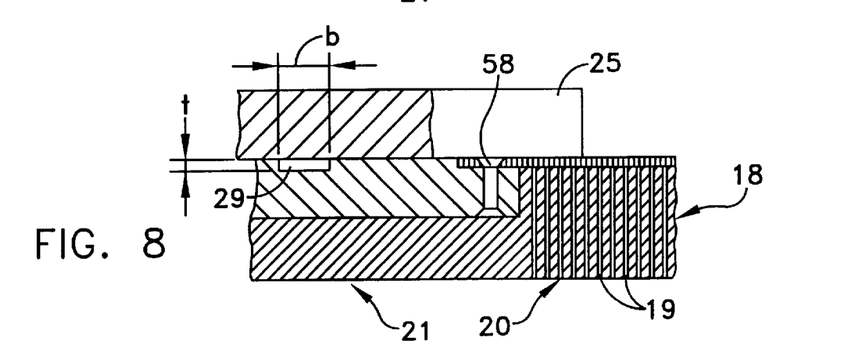
FIG. 8 shows a variant of an embodiment of FIG. 7.
Figure 9:
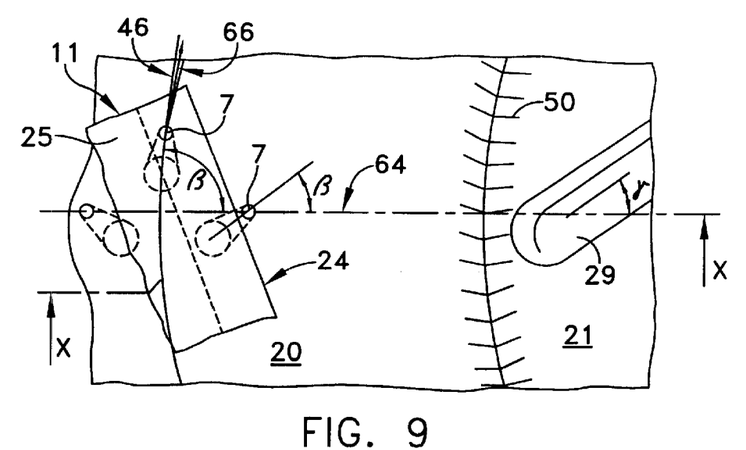
FIG. 9 shows a larger-scale elevation of the detail marked with IX in FIG. 6.
Figure 10:
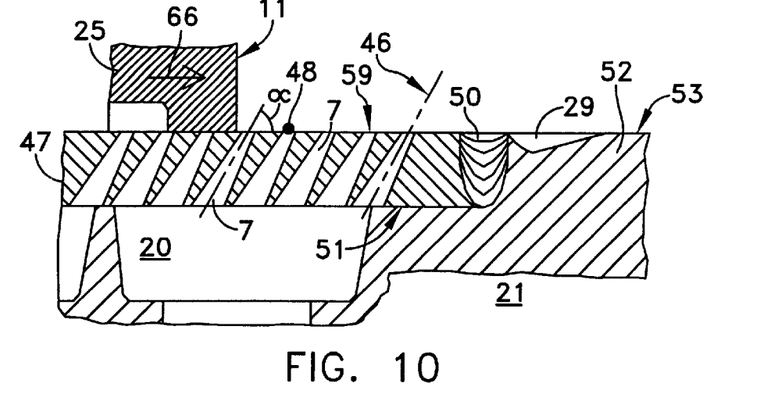
FIG. 10 is a section along the line X—X in FIG. 9.
Figure 11:
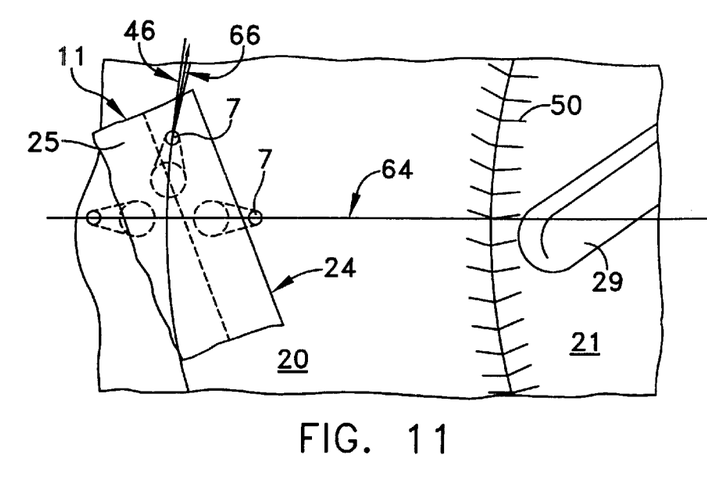
FIG. 11 shows a variant of an embodiment of FIG. 9.

In the embodiment in accordance with the FIGS. 5 to 10, the housing 1 has two flat-disk filter elements 3 placed parallel to each other. Both filter elements 3 are fixed rigidly in the housing 1 such that they cannot turn. The inflow channel 6 debouches into the space between the two filter elements 3 in which a flat scraper carrier 45 is located, which is positively connected to and rotates along with a central shaft 5 intersecting the housing 1. The scraper carrier 45 carries scrapers 11 arranged along curved paths. The filter elements 3 are circular in shape, and in their outer area (perforated zone 20), these filter elements are executed as finely perforated disks. The arrangement here can be like the one shown in FIG. 2, i.e. a thin-walled filter disk having fine filtering holes 7 is supported by a thicker supporting plate 18 having substantially less fine bores 19. However, as it is shown in FIG. 10, a relatively thin-walled plate constituting the actual filter element 3 may be provided, the cross section of whose filtering holes 7 increases in the flow direction of the filtrate, and the axes 46 of which holes 7 being inclined in relation to the plane of the filter plate 47 at an angle α, which is approx. 60° in the illustrated embodiment, but can preferably be from 50 to 80°. This inclination of the hole axes 46 makes it easier for the contaminant particles caught in the filtering holes 7, one of them being shown schematically by 48, to become free again, and protects the shearing edge 59 of the filter openings 7 from being worn. In addition, as shown in FIG. 9, the hole axes 46 can be inclined at an angle β to the radial direction 64, which angle is preferably 30 to 90° and need not be the same for all filtering holes 7. In extreme cases, this angle β can also be 0°, as shown in FIG. 11. The important thing is to make sure that when the scraping edges 24 of the scrapers 11 are circulating (arrow 66), they hit the hole axis 46 obliquely at an angle such that contaminant particles 48, if any, (FIG. 10) resting on the edge of the filtering hole 7 are drawn out of the filtering hole 7 instead of being pressed into it. As FIGS. 9 and 7 illustrate, the inclination β of the filtering holes 7 in relation to the radial direction 64 can therefore be directed toward both sides, if desired, although in most cases an unilateral inclination will be selected.

Figure 6:
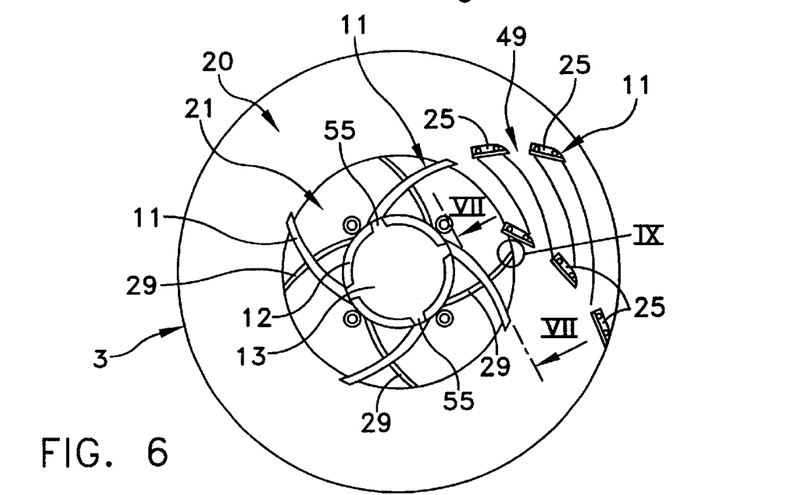
FIG. 6 is a larger-scale section through the scraper carrier disk along the line VI—VI in FIG. 5.

In the area of the perforated zone 20, only three holes 7 of which are shown in the FIGS. 9 and 11 for the sake of simplicity, the scrapers 11 are divided into scraper elements 25 spaced apart from each other. As FIG. 6 shows, these scraper elements 25 are arranged such that, as seen in the circumferential direction of the filter element 3, a gap 49 between two scraper elements 25 follows on each scraper element 25 of the preceding curved scraper strip, whereby, for safety's sake, a certain overlap is provided for. This arrangement ensures that solid particles can move through the gaps 49 but that they are always caught by the scraper element 25 of the following row of scraper elements. This, in turn, guarantees that the solid particles are reliably transported in the direction towards the waste discharge channel 12 (FIG. 6).

In the central area of the circular filter element 3 a non-perforated zone 21 with a thicker wall is provided. The perforated zone 20 may be connected with the non-perforated zone 21, as shown in FIGS. 9, 10 and 11, by a weld 50, whereby the filter plate 47 is placed in a step 51 of the circular plate 52 forming the non-perforated zone and welded on there. The grooves 29 are machined into the surface 53 of the plate 52 facing the scrapers 11, the direction of which grooves intersect with that of the scraping edges 24. The sawtooth-like cross section of the grooves 29 can be seen in FIG. 10. As FIG. 10 illustrates, the direction of the groove 29 is inclined in each case at an angle γ (FIG. 9) in relation to the radial direction 64, which angle decreases from the outside going inward in accordance with the curvature of the groove 29. However, the grooves 29 can also run straight, it is only important that the grooves 29 intersect with the paths of the scraper elements 25 in such a way that the grooves 29 contribute to transporting the contaminants toward the center of the filter element 3, that is toward the discharge channel 12.

This non-perforated zone 21 is also brushed over by scrapers 11, however as shown in FIG. 6, these scrapers 11 need not be subdivided into individual scraper elements in the area of the non-perforated zone 21, but can be subdivided, if desired. Suitably, the number of the scrapers in the area of the non-perforated zones 21 as counted in the circumferential direction should be the same as the number of grooves 29 there. The ledge-like scrapers 11 attached to the scraper carrier disk 45 and associated to the non-perforated zone 21 are usually not resiliently supported on the scraper carrier 45, as is the case for the scraper elements 25 of the perforated zone 20, but they are rigidly fixed to the scraper carrier 45. However, a springy scraper support can also be used for the non-perforated zone 21.

As mentioned, the scraper elements 25 in the perforated zone 20 and the scrapers 11 in the non-perforated zone 21 transport the residues in the direction towards a waste discharge channel 12, which contains two screws 13 both driven by the shaft 5, each of these screws being assigned to one of the two filter elements 3 and carrying away the contaminants scraped off this filter element 3. The directions of conveyance of the two screws 13 are opposite each other, and the residues are removed through two discharge openings 15 placed outside the housing 1. The advantage of this arrangement over one with a single discharge screw 13 is that the scraped-off and thickened contaminants need not be conveyed through a central opening in the scraper carrier disk 45. The direction in which the contaminants are conveyed away is indicated by arrows 54 in FIG. 5. At least one of the two screws 13 can have a temperature control unit assigned to it, e.g. a heating and/or cooling device, in order to ensure uniform removal on both sides.

Suitably, the arrangement should be such that there is a coordination between the inner ends of the scraper ledges 11 and the spaces between the consecutive flights 55 (FIG. 6) of the screw 13 such that the scraper ledges 11 always encounter a space between two adjacent flights 55. For this purpose, it is suitable to have the number of the screw flights 55 lying in the area of the scraper ledges 11 be less than or, at most, equal to the number of scraper ledges 11.

It can be seen from FIG. 7, that the ratio of the width b of each groove 29 to its depth is about 4:1. This ratio is usually between 2:1 and 6:1 and preferably between 3:1 and 5:1. FIG. 7 further illustrates a variant of attaching the perforated zone 20 to the non-perforated zone 21, namely to put an extension 57 on the plate-shaped supporting body 18 for the filter sheet metal 56 provided with fine openings 7, which extension piece 57 forms a step in which the plate into which the grooves 29 are machined, is placed and attached by means of rivets 58 to the filter sheet metal 56.

FIG. 8 shows a variant thereof, in which the non-perforated zone 21 is connected to the perforated zone 20 by a weld 50 similar to FIG. 10. FIG. 8 also shows that the cross section of the grooves 29 can also be nearly rectangular.

What is claimed is:

1. An apparatus for filtering plasticized thermoplastic synthetic plastic material, comprising:

a housing with at least one inflow channel for receiving the material to be filtered, which channel leads the material to be filtered to an inflow surface of an inflow side of at least one filter element, the filter element having a perforated zone of fine filtering holes through which the material to be filtered passes, the housing further including at least one outflow channel disposed adjacent an outflow side of the filter element for conducting filtrate out of the housing;

a plurality of scrapers disposed in the housing adjacent the inflow surface of the filter element, the scrapers having a scraping edge configured and arranged to move relative to the filter element, such that as the edges of the plurality of scrapers brush over the inflow surface of the filter element they push waste residues along the inflow surface of the filter element to at least one discharge channel; and a non-perforated zone adjoining the perforated zone of the filter element and disposed between the perforated zone and the discharge channel, which non-perforated zone is also brushed over by the scrapers, an inflow surface of the non-perforated zone including grooves facing the scrapers and adjoining the discharge channel, the direction of the grooves being constructed and arranged to intersect the path of the scraping edges brushing over these grooves such that thickened waste residue on the non-perforated zone is readily transported toward the discharge channel.

2. The apparatus of claim 1, wherein the non-perforated zone of the filter element including the grooves has a wall thickness greater than a wall thickness of the zone provided with filtering holes.

3. The apparatus of claim 1, wherein a ratio of a length of the non-perforated zone as measured in a direction in which the residues are removed, to that of the zone with filtering holes is from 0.5:1 to 1:1.

4. The apparatus of claim 1, wherein the filtering holes are disposed about axes inclined in a direction in which the residues are removed.

5. The apparatus of claim 4, wherein the axes are disposed at an angle of from 50 to 80° in relation to the surface of the filter element.

6. The apparatus of claim 1, wherein the grooves run along curved lines.

7. The apparatus of claim 5, wherein the grooves run along helical lines.

8. The apparatus of claim 7, wherein the grooves describe a curve curved opposite to that of the scrapers.

9. The apparatus of claim 1, wherein the scrapers and the grooves convey the thickened material towards a screw arranged in the discharge channel whereby the number of screw flights is equal to or lower than the number of scrapers.

10. The apparatus of claim 1, wherein the grooves have a sawtooth-like cross section and each include an inclined flank section facing the discharge channel so as to promote conveyance of the water residue toward the discharge channel.

11. The apparatus of claim 1, wherein the ratio of the width of each groove to its depth is between 3:1 and 5:1.

12. The apparatus of claim 1, wherein the grooves extend obliquely to an axis of the discharge channel.

13. The apparatus of claim 1, wherein the scrapers are pressed against the filter element in the perforated zone thereof.

14. The apparatus of claim 13, wherein the scrapers are pressed against the filter element by springs.

15. The apparatus of claim 13, wherein the scrapers are pressed against the filter element by the infed plastics material.

16. The apparatus of claim 1, wherein the filter element is disk-shaped.

17. The apparatus of claim 16, wherein with disk-shaped filter elements, the plastics material is fed in from an edge of the disk-shaped filter element, and that the discharge channel and the non-perforated zone are arranged in a center of the filter element, whereby a screw is positioned in the discharge channel to transport the residues.

18. The apparatus of claim 17, wherein each filtering hole in the perforated zone includes an axis, and each axis is inclined relative to a radial direction of the filter element.

19. The apparatus of claim 14, wherein each axis is inclined at an angle of from 30 to 95° in both the radial direction of the filter element and relative to a plane of the filter element.

20. The apparatus of claim 17, wherein the filter elements are disk-shaped and disposed parallel to each other and the inflow channel leads between the two filter elements which are brushed over by the scrapers, the scrapers being carried by a scraper carrier arranged between the filter elements and associated to the grooves of both filter elements.

21. The apparatus of claim 20, wherein to each of the two filter elements there is associated a section of the screw, whereby the two sections of the screw convey the material in opposite directions.

22. The apparatus of claim 21, wherein at least one of the two sections of the screw has a temperature control unit assigned to it.

23. The apparatus of claim 21, wherein the two sections of the screw are coupled for common rotation and are driven by a single motor.

24. The apparatus of claim 16, wherein the filter element has a cylindrical periphery.

25. The apparatus of claim 16, wherein the filter element has a circular periphery.

26. The apparatus of claim 1, wherein the scrapers are arranged along strip-like paths and each path is divided into spaced scraper elements, whereby gaps between adjacent scraper elements of successive scrapers are offset in relation to each other, as seen in a direction of rotation of the scraper or of the filter element, respectively.

* * * * *